(12) United States Patent
Pecor

(10) Patent No.: US 8,950,150 B1
(45) Date of Patent: Feb. 10, 2015

(54) APPARATUS FOR MAINTAINING OPTIMUM ORIENTATION OF TOWER MOUNTED DEVICES

(71) Applicant: Ray Pecor, Cedarburg, VT (US)

(72) Inventor: Ray Pecor, Cedarburg, VT (US)

(\*) Notice: Subject to any disclaimer, the term of this patent is extended or adjusted under 35 U.S.C. 154(b) by 0 days.

(21) Appl. No.: 14/320,964

(22) Filed: Jul. 1, 2014

Related U.S. Application Data

(63) Continuation-in-part of application No. 14/284,039, filed on May 21, 2014.

(51) Int. Cl.
*E04H 12/00* (2006.01)

(52) U.S. Cl.
USPC ........ 52/651.01; 52/835; 52/745.18; 248/527

(58) Field of Classification Search
USPC ............ 52/834, 835, 745.17, 745.18, 651.01, 52/651.07; 248/523, 527, 576; 343/891
See application file for complete search history.

(56) References Cited

U.S. PATENT DOCUMENTS

| | | | |
|---|---|---|---|
| 4,438,896 A * | 3/1984 | Hall | 248/523 |
| 5,465,529 A * | 11/1995 | Park | 47/40.5 |
| 6,111,553 A * | 8/2000 | Steenbuck | 343/891 |
| 6,351,092 B1 | 2/2002 | Vaassen et al. | |
| 6,621,245 B2 | 9/2003 | Vaassen et al. | |
| 6,626,412 B1 | 9/2003 | Lindsay | |
| 7,090,177 B2 | 8/2006 | Milton | |
| 8,277,184 B2 | 10/2012 | Nies et al. | |
| 8,464,990 B2 | 6/2013 | Flores | |
| 2002/0112441 A1 * | 8/2002 | Bissen | 52/736.1 |
| 2013/0300115 A1 | 11/2013 | Seem et al. | |
| 2013/0330188 A1 | 12/2013 | Ramsland | |

\* cited by examiner

*Primary Examiner* — Jeanette E Chapman
*Assistant Examiner* — Daniel Kenny
(74) *Attorney, Agent, or Firm* — Absolute Technology Law Group, LLC

(57) ABSTRACT

The present invention is an apparatus for maintaining the orientation of a tower-mounted device in use with a tower structure. The apparatus includes an adjustable vertical mount member positioned within a tower structure. Several adjustable rods move the vertical adjustable vertical mount member by adjusting their position relative to the tower. Movement of the adjustable vertical mount member in one direction causes an extended section of the adjustable vertical mount member to move in the opposite direction. This has the effect of adjusting the orientation of any device attached to the extended section.

20 Claims, 4 Drawing Sheets

APPARATUS FOR MAINTAINING OPTIMUM ORIENTATION OF TOWER MOUNTED DEVICES

CROSS-REFERENCE TO RELATED APPLICATIONS

This application claims priority to U.S. application Ser. No. 14/284,039 filed on May 21, 2014, which is hereby incorporated by reference in its entirety.

FIELD OF INVENTION

This invention relates to the field of supports and more specifically to an apparatus for making multi-planar adjustments of a mounted device.

TERMS OF ART

Figure 1A:
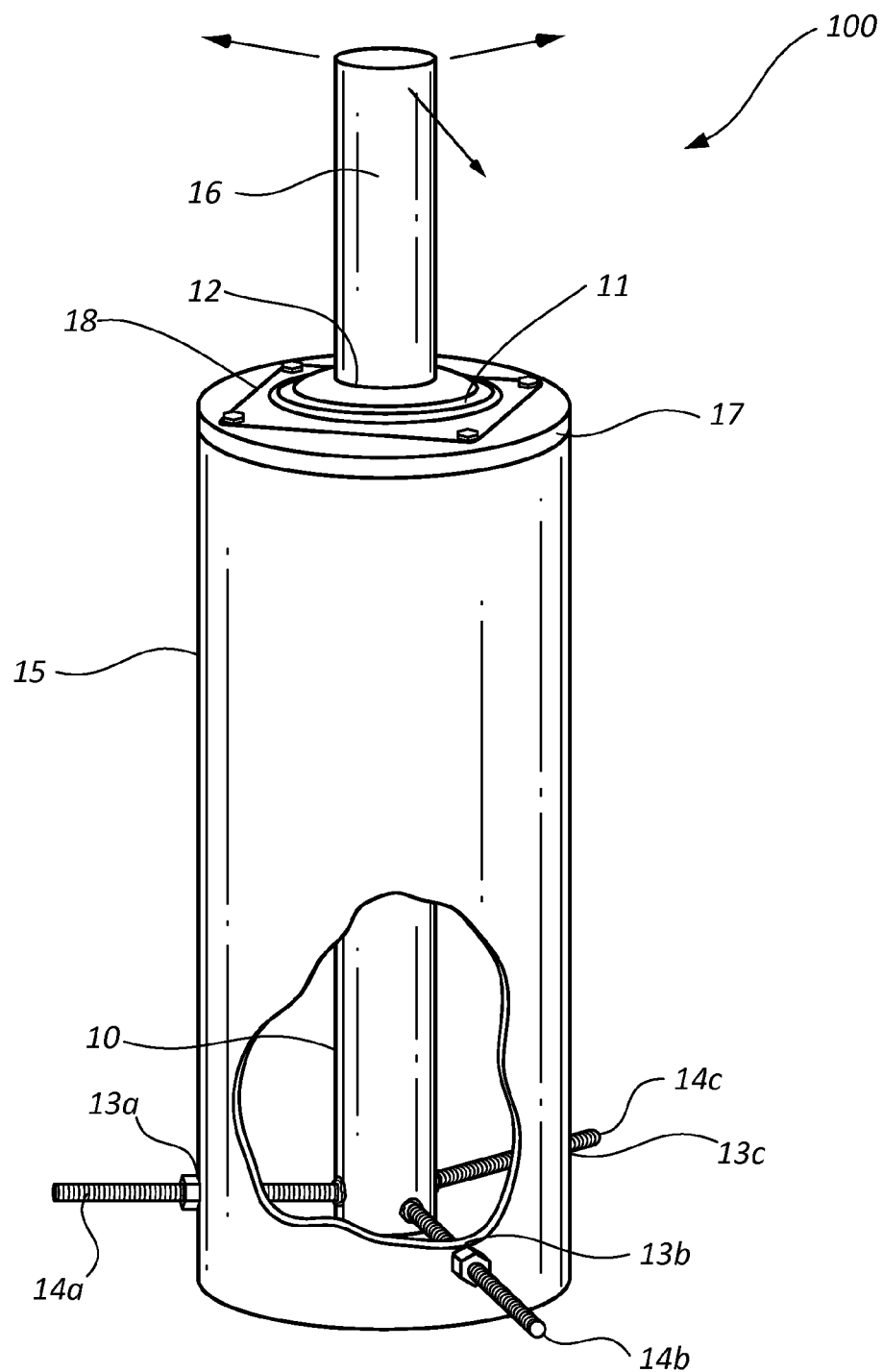
FIG. 1a illustrates an exemplary embodiment of an apparatus for establishing and maintaining the orientation of a tower-mounted device in use with a tubular tower structure.

As used herein, the term "optimum orientation" means the position of a device that optimizes the performance of the device.

As used herein, the term "tower structure" means any vertical structure known in the art to which a device can be attached. Tower structures include, but are not limited to a tubular tower structure, a lattice-type tower structure, buildings and other infrastructure elements, masts, vehicles, trees and naturally occurring vertical structures. A tower structure may include a combination of multiple tower structures, such as a tubular tower structure operably connected to a tree.

BACKGROUND

Many devices known in the art must be mounted to tower structures. Examples of tower-mounted devices known in the art include communications devices, transceivers, antennas, weather devices, photocells, cameras, wind turbines, solar devices and other types of sensors and generators. Tower structures on which devices are mounted range from approximately ten feet to several thousand feet in height. Common tower structures are tube shaped or include a structure of lattice members; however, other vertical structures such as trees, posts and buildings may be utilized as tower mounting structures.

In order for a tower-mounted device to function properly, the device must be optimally oriented relative to a pre-determined target. For example, a wind turbine requires a square, level, and plumb surface (relative to the level horizon) at the attachment point in order to allow the device to operate optimally. This enables the wind turbine to pivot or turn into the wind effectively, maximizing the amount of energy that can be converted from kinetic wind energy to electrical power. It is necessary to determine the optimum orientation of the turbine to the wind and to maintain that target orientation level to the horizon (not the ground). A deviation from the optimum orientation greatly compromises the system and introduces inefficiencies.

Similarly, other types of generators, cameras, communications devices, optical systems and sensors all must maintain a constant optimum orientation, depending on the device. For example, a surveillance camera must be mounted relative to the boundaries of the observation range to ensure that objects of interest remain within the camera's field of vision as the camera is rotated.

After installation of a tower mounted device, conditions such as ground settling, wind yawing, or load deflection may cause the mounted device to drift from the original optimal orientation and position, thus reducing the effectiveness and/or efficiency of the device.

Some mounting systems and devices known in the art orient a tower-mounted device by adjusting the entire vertical structure at the ground level. This means of adjustment can prove costly, as well as difficult to accomplish for very high towers. Furthermore, adjusting an entire tower structure in real time is not reasonably possible in the art.

Other mounting systems and devices use extremely complicated mechanical systems to orient the mounted device. For example, U.S. Pat. No. 8,277,184 to Nies et al. teaches an intricate arrangement of multiple bearings, gears, and adapters used to correctly orient a wind turbine. This system is difficult to fit to existing towers and too complex for an average user to correctly install.

There is an unmet need for a means to maintain optimum orientation of tower mounted devices without requiring manipulation of the tower structure.

There is a further unmet need for a universal tower mounting tool that can be used with a wide range of tower-mounted devices known in the art without requiring custom fabrication, re-engineering or specialized training to achieve orientation of tower-mounted device.

SUMMARY OF THE INVENTION

The present invention is an apparatus for establishing and/or maintaining the orientation of a tower-mounted device in use with a tower structure or outer member. The apparatus includes an adjustable vertical mount member positioned within a tower structure or outer member. Several adjustable rods move the adjustable vertical mount member by altering their position relative to the tower structure or outer member. Movement of the adjustable vertical mount member in one direction causes an extended section of the adjustable vertical mount member to move in the opposite direction. This has the effect of changing the orientation of any device attached to the extended section.

DETAILED DESCRIPTION OF INVENTION

For the purpose of promoting an understanding of the present invention, references are made in the text to exemplary embodiments of an orientation apparatus and system, only some of which are described herein. It should be understood that no limitations on the scope of the invention are intended by describing these exemplary embodiments. One of ordinary skill in the art will readily appreciate that alternate but functionally equivalent components may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale, instead emphasis has been placed upon illustrating the principles of the invention. In addition, in the embodiments depicted herein, like reference numerals in the various drawings refer to identical or near identical structural elements.

Moreover, the terms "about", "substantially" or "approximately" as used herein may be applied to modify any quantitative representation that could permissibly vary without resulting in a change in the basic function to which it is related.

FIG. 1a illustrates an exemplary embodiment of an apparatus 100 for maintaining the orientation of a tower-mounted device in use with a tubular tower structure 15. Apparatus 100 includes an adjustable vertical mount member 10, a pivot member 11, a pivot point 12, apertures 13a-13c, adjustable rods 14a-14c, an extended section 16 and an optional tower top 17.

Adjustable vertical mount member 10 is positioned within tower structure 15. In the exemplary embodiment, adjustable vertical mount member 10 is a cylindrical steel pipe. Various other embodiments include, but are not limited to solid or hollow adjustable vertical mount members with circular, triangular, square, rectangular, pentagonal or hexagonal cross-sections. Materials used may include, but are not limited to steel, aluminum, copper, iron, composite and polymer.

The adjustable vertical mount member 10 includes an extended section 16 beyond pivot point 12. Extended section 16 has a first end attached to a second end of adjustable vertical mount member 10 and a second end. In the embodiment shown, extended section 16 and adjustable vertical mount member 10 connect at pivot point 12. In alternate embodiments, extended section 16 and adjustable vertical mount member 10 are a single integrated piece. Extended section 16 also includes at least one mounting point, to which at least one device is mounted. Various devices mounted to extended section 16 include, but are not limited to mounting platforms, wind pumps, wind turbines and other generators, cameras, communications devices, optical systems and sensors.

For a given length L of extended section 16, the location of the mounting point or points is controlled by the number and type of devices mounted to extended section 16, using the expression $$\sigma > \frac{\left((F_m * y_m) + \left(\sum_1^n F_i * y_i\right)\right) * c}{I}$$

where $\sigma$ is the yield strength of extended section 16, $F_m$ is the maximum force acting at the extended section 16 midpoint $y_m$, $y_m$ is one-half the length L of extended section 16, n is the number of devices mounted to extended section 16, $F_i$ is the maximum force acting on location $y_i$, location $y_i$ is a distance between at least one mounting point and the first end of extended section 16, c is one half of the diameter of extended section 16, and I is the moment of inertia of extended section 16. Alternate embodiments may include application specific considerations to account for additional factors such as water surge, wind and gust factors, safety factors, fatigue considerations, and so on.

The maximum forces $F_m$ and $F_i$ are forces generated by environmental conditions, such as, but not limited to wind, waves or water currents interacting with the extended section 16 or device. The configuration of the device or extended section 16 affects the maximum forces $F_m$ and $F_i$. For example, under the same environmental conditions a device with an expansive geometry, such as a windmill sail, will experience a greater maximum force $F_i$ than a more compact device, such as a camera.

In the embodiment of FIG. 1a, the point at which the adjustable vertical mount member 10 begins to extend beyond the tower structure 15 is a pivot point 12. Inclusion of a pivot member 11 at pivot point 12 allows pivoting of adjustable vertical mount member 10 and extended section 16 about pivot point 12. In the exemplary embodiment, pivot member 11 is a spherical bearing. Optionally, pivot member 11 may be attached to tower structure 15 by a tower top 17, which includes a mounting aperture 18 to which pivot member 11 is attached.

Tower structure 15 includes at least three apertures 13a-13c, each adapted to receive one of three adjustable rods 14a-14c. In various embodiments, apertures 13a-13c are located in tower structure 15 or in additional components of apparatus 100.

Adjustable rods 14a-14c, affixed towards a bottom location on adjustable vertical mount member 10, are equally spaced around adjustable vertical mount member 10 in a symmetrical, radial pattern on an approximately horizontal plane. In various embodiments the radial pattern of adjustable rods 14a-14c may be asymmetrical around adjustable vertical mount member 10. In various embodiments, adjustable rods 14a-14c are located on different planes. In various embodiments, adjustable rods 14a-14c also include integrally formed hooks or eyelets for direct connection to adjustable vertical mount member 10.

In use, moving one or more of adjustable rods 14a-14c in or out through apertures 13a-13c causes the extended section 16 to move proportionally in an opposite direction to accomplish the desired orientation adjustment of a mounted device. The exemplary embodiment of FIG. 1a permits adjustments in at least three complimentary directions relatively perpendicular to the primary vertical axis of tower structure 15. The adjustment may be maximized or minimized as needed per application due to the integral pivoting point action. Various embodiments utilize increased numbers of corresponding apertures and adjustable rods to increase the adjustment sensitivity of apparatus 100.

Movement of adjustable rods 14a-14c may be manual or performed by an electronically controlled power driven actuator. For an easily accessible manual apparatus, simple hand tools can be used to make in/out adjustments via an arrangement of hex nuts at apertures 13a-13c of apparatus 100. A powered version may accomplish the in/out adjustment via a feedback loop and power driven actuators at apertures 13a-13c of apparatus 100. Power driven actuators may include, but are not limited to drives, servo motors, encoders, pneumatics, hydraulics, feedback loops, and wired/wireless remote controls.

Adjustment control systems include Artificial Intelligence (AI), Programmable Logic Controllers (PLC), and/or DNC/CNC systems to facilitate and control the adjustments for orientation maintenance. Other systems include commercially available software packages using load or force sensors. These systems may provide feedback for manual adjustment or may control power driven actuators.

Optionally, pivot member 11 attaches to tower structure 15 by a tower top 17, which includes a mounting aperture 18.

Figure 1B:
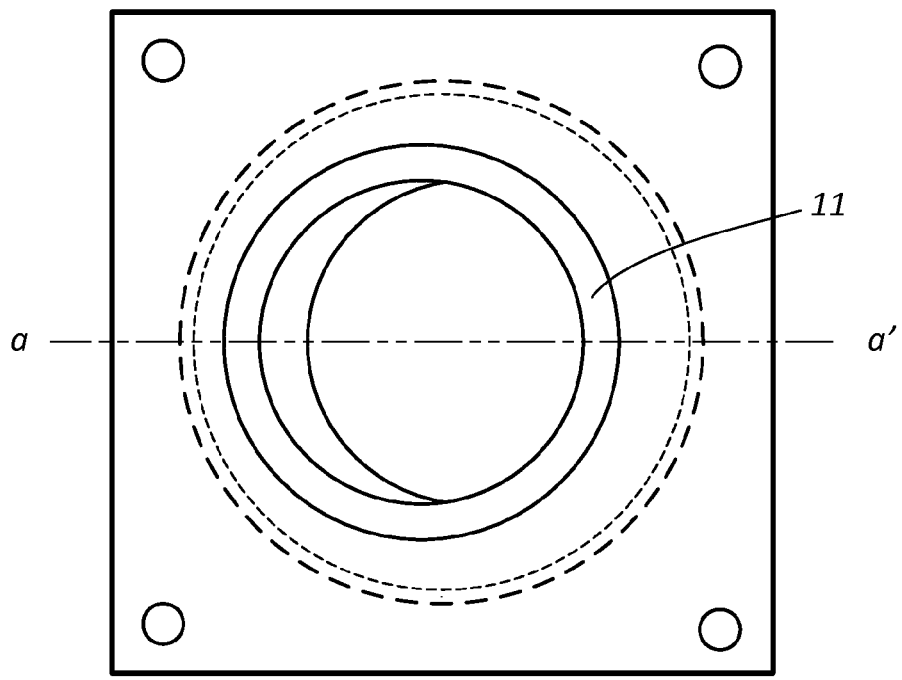
FIGS. 1b and 1c illustrate top and cross sectional views, respectively, of an exemplary embodiment of a pivot member.
Figure 1C:
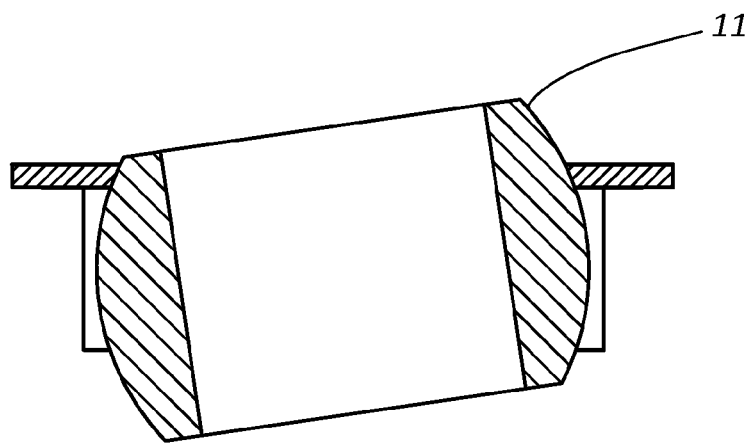

FIGS. 1b and 1c illustrate top and cross sectional views, respectively, of an exemplary embodiment of a pivot member 11. The cross section view of FIG. 1c is taken along the line a-a' of FIG. 1b. In the exemplary embodiment, pivot member 11 is a spherical bearing.

Figure 2A:
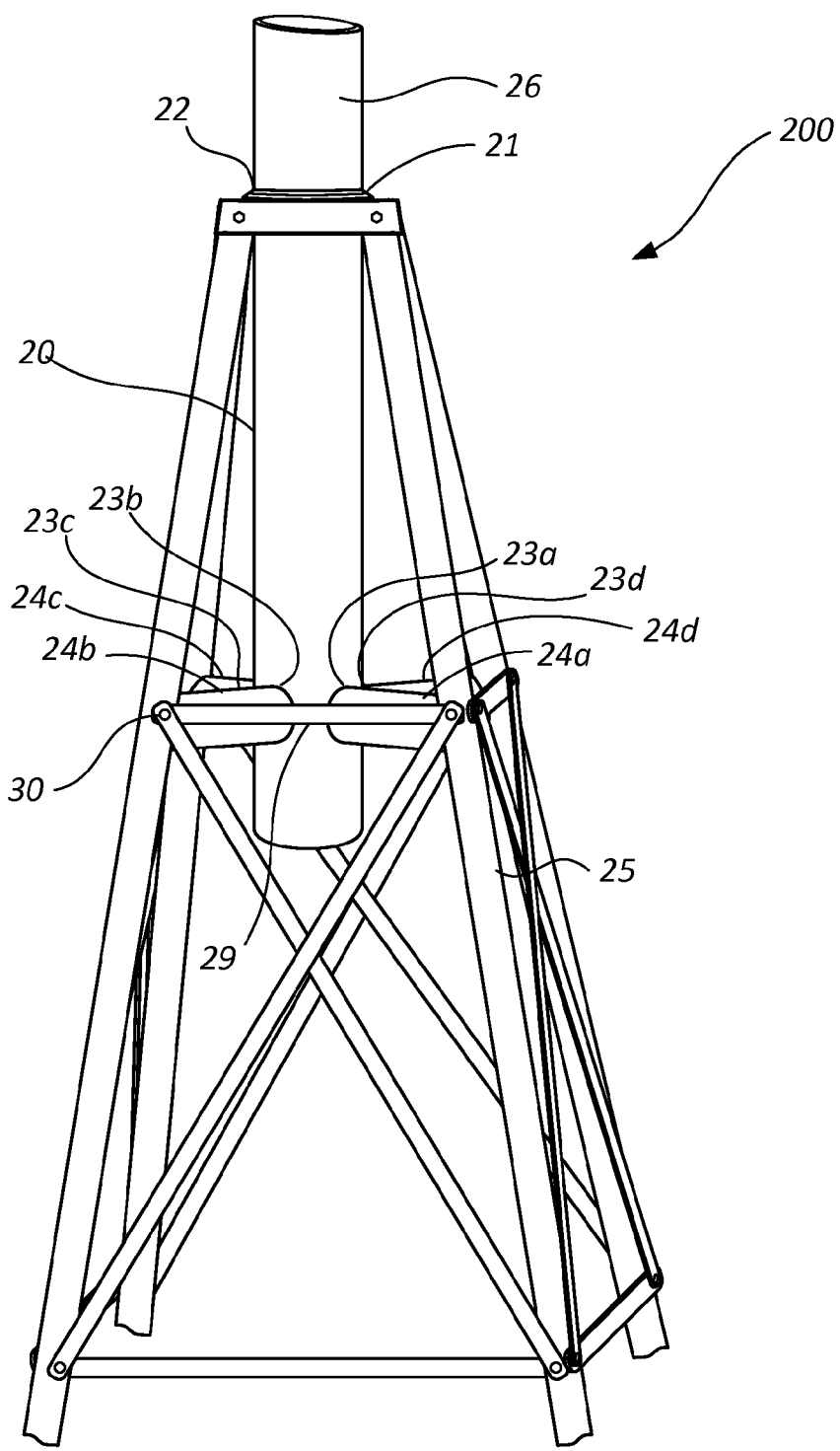
FIG. 2a illustrates an exemplary embodiment of an apparatus for establishing and maintaining the orientation of a tower-mounted device in use with a lattice tower structure.

FIG. 2a illustrates an exemplary embodiment of an apparatus 200 for maintaining the orientation of a tower-mounted device in use with a lattice type tower structure 25. Apparatus 200 includes an adjustable vertical mount member 20, a pivot member 21, a pivot point 22, apertures 23a-23d, adjustable rods 24a-24d and an extended section 26.

The adjustable vertical mount member 20, pivot point 22, apertures 23a-23d, adjustable rods 24a-24d and extended section 26 of apparatus 200 are substantially identical in form and function to their counterparts in apparatus 100.

In the embodiment of FIG. 2a, pivot member 21 is a welded, rigid cap. In various other embodiments pivot member 21 may be formed by die pressing, drawing, extrusion or other fabrication operations. During orientation adjustment, motion is allowed by overall assembly flexure of lattice type tower structure 25. Moving the adjustable vertical mount member 20 at apertures 23 causes the extended section 26 to flex proportionally in an opposite direction to accomplish the desired orientation adjustment of the mounted device.

In one embodiment, a lattice type tower, such as tower structure 25, incorporates a leveling brace 29 at a common bracing connection point 30 to reinforce tower structure 25.

Figure 2B:
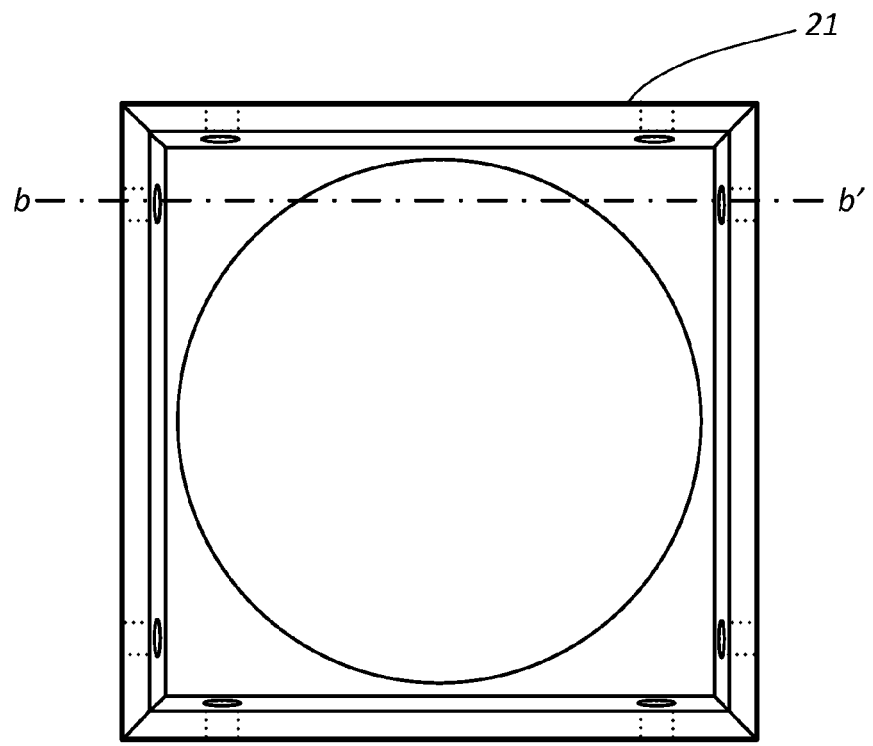
FIGS. 2b and 2c illustrate bottom and cross sectional views, respectively, of an exemplary embodiment of a pivot member.
Figure 2C:
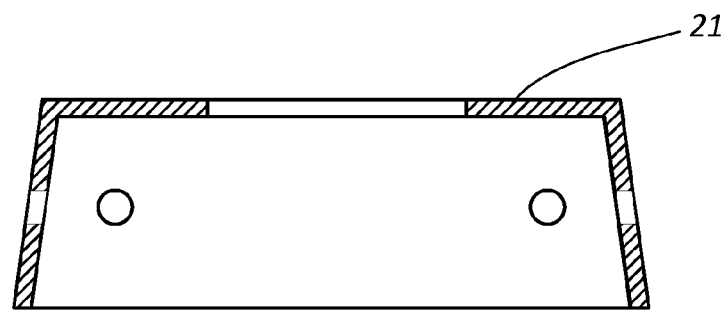

FIGS. 2b and 2c illustrate bottom and cross sectional views, respectively, of an exemplary embodiment of a pivot member 21. The cross section view of FIG. 2c is taken along the line b-b' of FIG. 2c. In the exemplary embodiment, pivot member 21 is a rigid cap to which adjustable vertical mount member 20 and extended section 26 are rigidly attached. While the exemplary embodiment attaches adjustable vertical mount member 20 and extended section 26 to pivot member 21 by welding, other contemplated embodiments utilize soldering, brazing, adhesives or other attachment means.

What is claimed is:

1. An apparatus comprised of:
   a tower structure;
   an adjustable vertical mount member located within said tower structure, having a first end and a second end;
   an extended section located above said tower structure having a length L, wherein a first end of said extended section is operatively connected to said second end of said adjustable vertical mount member, wherein at least one device is mounted to said extended section on at least one mounting point, wherein a location of said at least one mounting point is controlled by the expression $$\sigma > \frac{\left((F_m * y_m) + \left(\sum_1^n F_i * y_i\right)\right) * c}{I}$$

where $\sigma$ is a yield strength of said extended section, $F_m$ is a maximum force acting at an extended section midpoint $y_m$, $y_m$ is one-half of length L, n is a number of said at least one device mounted to said extended section, $F_i$ is a maximum force acting on a location $y_i$, location $y_i$ is a distance between said at least one mounting point and said first end of said extended section, c is one half of a diameter of said extended section, and I is a moment of inertia of said extended section;
   a pivot member located atop said tower structure, wherein said pivot member is operably attached to said adjustable vertical mount member and said extended section; and
   at least three adjustable rods operatively connected to said adjustable vertical mount member and said tower structure, wherein said at least three adjustable rods are equally spaced around said adjustable vertical mount member in a radial pattern,
   wherein positions of said at least three adjustable rods relative to said tower structure may be linearly adjusted to alter an orientation of said adjustable vertical mount member within said tower structure and an orientation of said extended section located outside of said tower structure.

2. The apparatus of claim 1, wherein said tower structure is a tubular type tower structure.

3. The apparatus of claim 1, wherein said tower structure is a lattice type tower structure.

4. The apparatus of claim 3, wherein said lattice type tower structure includes a leveling brace operably connected to said lattice type tower structure at a common bracing connection point.

5. The apparatus of claim 1, wherein said pivot member is a spherical bearing.

6. The apparatus of claim 1, wherein said pivot member is a rigid cap.

7. The apparatus of claim 1, wherein said pivot member is operably connected to said tower structure by a tower top, wherein said tower top includes a mounting aperture to which said pivot member is operably connected.

8. The apparatus of claim 1, wherein each of said at least three adjustable rods passes through one of at least three apertures in said tower structure.

9. The apparatus of claim 8, wherein each of said at least three adjustable rods is operably attached to a manually rotated hex nut.

10. The apparatus of claim 1, wherein each of said at least three adjustable rods is operably attached to a power driven actuator.

11. The apparatus of claim 10, wherein said power driven actuator is selected from the group consisting of: drives, servo motors, encoders, pneumatics, hydraulics, feedback loops, wired remote controls and wireless remote controls.

12. The apparatus of claim 1, wherein a position of at least one of said at least three adjustable rods may be adjusted relative to said tower structure by rotation about said at least one of said at least three adjustable rod's longitudinal axis.

13. The apparatus of claim 1, wherein a position of at least one of said at least three adjustable rods may be adjusted relative to said tower structure by linear movement along said at least one of said at least three adjustable rod's longitudinal axis.

14. The apparatus of claim 1, wherein each of said at least three adjustable rods is operably attached to said adjustable vertical mount member by an eyelet or hook integrally formed in each of said at least three adjustable rods.

15. The apparatus of claim 1, further including an adjustment control system operably connected to said at least three adjustable rods.

16. The apparatus of claim 15, wherein said adjustment control system includes at least one sensor.

17. The apparatus of claim 15, wherein said adjustment control system is configured with software to provide said orientation of said extended section in real time.

18. The apparatus of claim 15, wherein said adjustment control system is configured with software to adjust said orientation of said extended section in real time by actuating at least one power driven actuator operably attached to each of said at least three adjustable rods.

19. The apparatus of claim 1, further including a device mounted to said extended section.

20. The apparatus of claim 19, wherein said device is selected from the group consisting of: mounting platforms, wind pumps, wind turbines, generators, cameras, communications devices, optical systems and sensors.

* * * * *

UNITED STATES PATENT AND TRADEMARK OFFICE
CERTIFICATE OF CORRECTION

| | |
|---|---|
| PATENT NO. | : 8,950,150 B1 |
| APPLICATION NO. | : 14/320964 |
| DATED | : February 10, 2015 |
| INVENTOR(S) | : Ray Pecor |

Page 1 of 1

It is certified that error appears in the above-identified patent and that said Letters Patent is hereby corrected as shown below:

On the Title Page

Item (71) Applicant: Ray Pecor, Cedarburg, "VT" --WI-- (US)

Item (72) Inventor: Ray Pecor, Cedarburg, "VT" --WI-- (US)

Signed and Sealed this
Second Day of June, 2015

Michelle K. Lee
*Director of the United States Patent and Trademark Office*